United States Patent [19]

Bergman et al.

[11] 4,420,469

[45] Dec. 13, 1983

[54] PYROHYDROLYSIS OF COLUMBIUM OXYFLUORIDE TO COLUMBIUM OXIDE

[75] Inventors: Roger M. Bergman, Sanatoga; Edwin J. Bielecki, Boyertown; Charles R. Nippert, Jr., Pottstown, all of Pa.

[73] Assignee: Cabot Corporation, Boston, Mass.

[21] Appl. No.: 384,077

[22] Filed: Jun. 1, 1982

[51] Int. Cl.³ ............................................. C01G 33/00
[52] U.S. Cl. .................................................... 423/592
[58] Field of Search ......................................... 423/592

[56] References Cited

U.S. PATENT DOCUMENTS 3,072,459  1/1963  Foos et al. .......................... 423/592
3,409,391 11/1968  Mosheim ............................ 423/592

Primary Examiner—Herbert T. Carter
Attorney, Agent, or Firm—Robert J. Feltovic; Jack Schuman; Lawrence A. Chaletsky

[57] ABSTRACT

A process for converting columbium oxyfluoride ($CbO_2F$) to columbium oxide ($Cb_2O_5$) comprising heating $CbO_2F$ under select pyrohydrolysis conditions.

7 Claims, No Drawings

PYROHYDROLYSIS OF COLUMBIUM OXYFLUORIDE TO COLUMBIUM OXIDE

Columbium-containing ores effectively have been processed by digesting the ores with hydrofluoric acid to leach the soluble columbium and tantalum values. The task of separation and purification of the metals is carried out through liquid/liquid extraction techniques, using any suitable solvent, commonly methyl isobutyl ketone (MIBK). The hydrofluoric acid digest solution is contacted with the ketone, and, under conditions of high acidity, both columbium and tantalum are transferred to the organic phase while other elements remain in the raffinate. When the organic extract is contacted with a low acidity solution, the columbium is preferentially back-extracted into the aqueous phase, leaving the tantalum in the organic phase.

Recovery of the columbium values from the aqueous phase, which essentially is an MIBK saturated aqueous solution of an oxyfluorocolumbic acid ($H_2CbOF_5$) and hydrogen fluoride (HF), is typically performed by treatment with ammonia to precipitate columbium hydroxide ($Cb(OH_5)$) which then can be converted to columbium oxide ($Cb_2O_5$) by high temperature calcination treatment. By-product ammonium fluoride generated by this process, however, creates a significant problem of environmental disposal or recovery.

An alternative technique, avoiding the use of ammonia, is disclosed in U.S. Pat. No. 4,164,417 (issued Aug. 14, 1979 to Robert A. Gustison). In this method, columbium values are recovered from aqueous hydrofluoric acid solutions by evaporating such solutions to dryness and then baking the residue to recover a columbium oxyfluoride product (generally represented by the formula $CbO_2F$). The columbium oxyfluoride can be converted to columbium oxide ($Cb_2O_5$), if desired, by calcination.

As reported in the above-cited Gustison patent, columbium oxyfluoride ($CbO_2F$) material can be calcined in the presence of water vapor at about 500° to 1000° C. to form columbium oxide ($Cb_2O_5$) according to the equation:

$$2\,CbO_2F + H_2O \xrightarrow{\Delta} Cb_2O_5 + 2\,HF \quad (A)$$

However, it now has been found that while the reaction appears to proceed according to this equation at the lower end of this temperature range (i.e. 500° to about 600° C.), at temperatures above about 600° C. a competing alternative reaction mechanism appears to become more significant with increasing temperature and results in a limited yield of $Cb_2O_5$. This alternative reaction, as theorized by applicants, follows the equation:

$$6\,CbO_2F\,(s) \xrightarrow{\Delta} 2\,Cb_2O_5\,(s) + 2\,CbOF_3\,(g) \quad (B)$$

At temperatures below about 600° C., the mechanism of the reaction proceeds according to equation (A); but, the reaction proceeds too slowly for practical utility. Above about 600° C., the mechanism outlined in equation (B) becomes more significant and gaseous $CbOF_3$ by-product begins to be rapidly generated; this equation serves to explain the columbium oxide yield reduction noted in practicing the calcination process of the Gustison patent at temperatures above about 600° C. While the increased reaction rates at temperatures above about 600° C. are very desirable for practical commercial utility of the process, the reduced yields at these temperatures make the process impractical.

Now, according to the present invention, an improved process has been discovered for producing columbium oxide from columbium oxyfluoride. Using select conditions of pyrohydrolysis, columbium oxyfluoride can be converted to columbium oxide with significantly enhanced yields and at commercially acceptable reaction rates.

Pursuant to the invented process, a columbium oxyfluoride material is heated at select calcining temperatures in an atmosphere containing a critical volume percentage of water vapor to yield a columbium oxide product. Calcination temperatures range from at least about 600° up to about 1200° C.; preferably the temperature ranges from about 700° to about 1100° C.; most preferably the temperature ranges from 850° to about 1000° C. The pyrohydrolysis reaction must be conducted in an atmosphere containing at least about two percent by volume water vapor in a total amount of water sufficient to provide a proportion of at least about 0.5 mole of water for every mole of columbium oxyfluoride reactant during the time of reaction. Preferably, about five to about fifty percent water vapor is present; most preferably about ten to about twenty-five percent water vapor is present.

Typically, the water vapor containing atmosphere is introduced by flowing a gaseous stream through the reaction chamber. The flow rate is not critical, as long as at least about 0.5 mole of water per mole of columbium oxyfluoride is made available to the reactant during the time of reaction. This critical amount of water readily can be explained by a review of the reaction mechanisms, theorized by applicants, and as set forth in equation (A) above and in the following equations:

$$6\,CbO_2F\,(s) \xrightarrow{\Delta} 2\,Cb_2O_5\,(s) + 2\,CbOF_3\,(g) \quad (B)$$

$$2\,CbOF_3\,(g) + 3\,H_2O\,(g) \xrightarrow{\Delta} Cb_2O_5\,(s) + 6\,HF\,(g) \quad (C)$$

Sufficient water must be present to react with the gaseous $CbOF_3$ by-product and prevent its loss while converting it to the desired oxide product. In this manner, there is avoided the loss of the gaseous $CbOF_3$ which otherwise would account for a theoretical yield reduction of about 33 percent. At least a stoichiometric amount of water must be available during the reaction. In this instance, it is apparent from the equations that 0.5 mole of water per mole of $CbO_2F$ is the stoichiometric amount required for complete conversion to $Cb_2O_5$. Generally, however, an amount of water in excess of the stoichiometric amount is introduced to ensure completion of the reaction.

The following examples are provided to further illustrate the invention. The examples are intended to be illustrative in nature and are not to be construed as limiting the scope of the invention.

EXAMPLES 1–50

A 25 g sample of columbium oxyfluoride ($CbO_2F$) powder was placed in a flat, open boat to a depth of about 2 mm. The boat then was inserted into a preheated four inch diameter tube furnace, through which was flowing a gas stream of preheated $N_2$ and/or $H_2O$ vapor of the desired composition. The gas stream was passed through the furnace at a flow rate adjusted to introduce a stoichiometric amount of water per minute. After the predetermined treatment time, the boat containing the sample was pulled into the cool end of the tube furnace where it was allowed to cool to about 100° C. The boat then was removed from the furnace; the columbium material in the boat was allowed to cool to ambient temperature and was weighed and analyzed. Percents of input Cb recovered in the boat as $Cb_2O_5$ and $CbO_2F$ were calculated from weight loss of product on heating at 1000° C. for at least one hour. The results of a series of representative runs are reported in the table below:

| Example No. | Furnace Temp (°C.) | Treatment Time (hrs) | Gas Stream (Vol. % $H_2O$) | % Cb Recovered As Product $Cb_2O_5$ | % Cb Remaining As Unreacted $CbO_2F$ |
|---|---|---|---|---|---|
| 1.* | 500 | 23 | 100 | 91 | 9 |
| 2. | 600 | 2 | 100 | 90 | 8 |
| 3. | 600 | 8 | 100 | 94 | 1 |
| 4.* | 650 | 6 | 0 | 18 | 56 |
| 5. | 650 | 2 | 50 | 95 | 2 |
| 6.* | 700 | 2.0 | 0 | 35 | 44 |
| 7. | 700 | 2.0 | 25 | 96 | 1 |
| 8. | 700 | 2.0 | 50 | 95 | 1 |
| 9. | 700 | 2.0 | 100 | 95 | 1 |
| 10. | 750 | 2.0 | 50 | 93 | <1 |
| 11.* | 800 | 2.0 | 0 | 56 | 18 |
| 12. | 800 | .25 | 5 | 63 | 32 |
| 13. | 800 | .25 | 25 | 92 | 5 |
| 14. | 800 | .25 | 50 | 95 | <1 |
| 15. | 800 | .5 | 5 | 81 | 15 |
| 16. | 800 | .5 | 25 | 94 | 1 |
| 17. | 800 | .5 | 50 | 92 | 1 |
| 18. | 800 | 2.0 | 50 | 94 | 1 |
| 19. | 800 | .25 | 100 | 94 | 2 |
| 20.* | 850 | .5 | 0 | 55 | 18 |
| 21. | 850 | 2.0 | 2 | 92 | <1 |
| 22. | 850 | .5 | 5 | 88 | 8 |
| 23. | 850 | .5 | 25 | 94 | 1 |
| 24. | 850 | .5 | 50 | 91 | <1 |
| 25. | 850 | 2.0 | 5 | 94 | <1 |
| 26. | 850 | 2.0 | 25 | 89 | <1 |
| 27. | 850 | 2.0 | 50 | 96 | <1 |
| 28. | 850 | 2.0 | 3.2 | 95 | <1 |
| 29. | 900 | .5 | 5 | 90 | 1 |
| 30. | 900 | .5 | 25 | 94 | 1 |
| 31. | 900 | .5 | 50 | 93 | 1 |
| 32. | 900 | 2.0 | 5 | 85 | <1 |
| 33. | 900 | 2.0 | 25 | 91 | <1 |
| 34. | 900 | 2.0 | 50 | 92 | <1 |
| 35.* | 950 | .5 | 0 | 59 | 10 |
| 36. | 950 | .5 | 5 | 73 | <1 |
| 37. | 950 | .5 | 25 | 93 | <1 |
| 38. | 950 | .5 | 50 | 94 | 1 |
| 39. | 950 | 2.0 | 5 | 82 | <1 |
| 40. | 950 | 2.0 | 25 | 90 | <1 |
| 41. | 950 | 2.0 | 50 | 96 | 1 |
| 42.* | 1000 | 2.0 | 0 | 55 | <1 |
| 43. | 1000 | .5 | 5 | 75 | 1 |
| 44. | 1000 | .5 | 25 | 92 | 2 |
| 45. | 1000 | .5 | 50 | 95 | 1 |
| 46. | 1000 | 2.0 | 5 | 78 | <1 |
| 47. | 1000 | 2.0 | 25 | 89 | 1 |
| 48. | 1000 | 2.0 | 50 | 92 | 1 |
| 49. | 1100 | .5 | 25 | 86 | <1 |
| 50. | 1100 | .5 | 100 | 87 | <1 |

*Comparative

COMPARATIVE EXAMPLE 51

An indirectly heated rotary calciner, 4 inches inner diameter, with a heated length of 25.5 inches was heated to 1050° F. $CbO_2F$ was fed into the calciner at a rate of 10 g/min for 2.5 hr. The residence time of solids in the heated zone was 30 minutes. No water vapor was intentionally added to the reactor. Minimal air inleakage occured through the shrouded equipment. Seventy-seven percent of the columbium in the feed $CbO_2F$ was recovered as $Cb_2O_5$.

EXAMPLE 52

Using the same equipment as in comparative Example 53, heated to 900° C., $CbO_2F$ was fed into the reactor at a rate of 23 g/min for 2.5 hr. Residence time of the solids in the heated zone again was 30 minutes. Steam was injected into the kiln at a rate of 45 g/min. The conversion efficiency of the $CbO_2F$ to $Cb_2O_5$ was 99 percent.

EXAMPLE 53

Using the same equipment as in Example 53, $CbO_2F$ was fed into the calciner at a rate of 12.9 g/min for 4.5 hours. The bed temperature of the calciner was measured by optical pyrometer to be 895° C. Steam was introduced into the calciner at a rate of 10.3 g/min; air was allowed to enter at a rate of 75 scfh. The gas velocity in the calciner was about 75 ft/min, for a gas residence time of about 2 seconds; the moisture content of the gas phase was 6.8 percent at the entrance of the reaction zone of the reactor. The conversion efficiency of the $CbO_2F$ to $Cb_2O_5$ was 87 percent.

EXAMPLE 54

A larger scale example was run using a brick lined, direct gas fired rotary kiln equipped with a cyclone to remove solids from the exhaust. The kiln had an inner diameter of 15 inches and was 12.5 feet long. The bed temperature in the kiln ranged from 1050° C. at the flame (discharge) end to 650° C. at the feed (gas exhaust) end. The solid residence time was 4 hours. Gas velocity was between 91 and 120 ft/min, equivalent to a gas residence time of about 6 to 8 seconds. Water vapor was about 14.6 percent of the gas phase.

A total of 898 kg of $CbO_2F$ was fed into the kiln. Backout and cyclone discharge was recycled. The conversion efficiency of the $CbO_2F$ to $Cb_2O_5$ was 95 percent.

The embodiments of the invention in which an exclusive property or privilege is claimed are defined as follows:

1. A process for the production of columbium oxide comprising: pyrohydrolyzing a columbium oxyfluoride material by heating it at a temperature ranging from at least about 600° C. to about 1200° C. in the presence of a flowing water vapor atmosphere containing at least about two percent by volume water introduced at a rate sufficient to provide at least about 0.5 mole of water per mole of said columbium oxyfluoride reactant during the time of reaction of $CbO_2F$ to form $CbOF_3$.

2. The process of claim 1 wherein the pyrohydrolysis is conducted at a temperature ranging from about 700° C. to 1100° C.

3. The process of claim 1 wherein the pyrohydrolysis is conducted at a temperature ranging from about 850° C. to about 1000° C.

4. The process of claim 1 wherein the water vapor atmosphere contains about five to about fifty percent by volume water vapor.

5. The process of claim 1 wherein the water vapor atmosphere contains about ten to about twenty-five percent by volume water vapor.

6. The process of claim 1 comprising heating the columbium oxyfluoride material at a temperature ranging from about 700° C. to about 1100° C. in the presence of a water vapor atmosphere in the form of a flowing gaseous stream containing about five to about fifty percent water vapor introduced at a rate sufficient to provide at least about 0.5 mole of water per mole of columbium oxyfluoride reactant during the time of reaction.

7. The process of claim 1 comprising heating the columbium oxyfluoride material at a temperature ranging from about 850° C. to about 1000° C. in the presence of a water vapor atmosphere in the form of a flowing gaseous stream containing about ten to about twenty-five percent water vapor introduced at a rate sufficient to provide at least about 0.5 mole of water per mole of columbium oxyfluoride reactant during the time of reaction.

* * * * *